(12) United States Patent
Falasz

(10) Patent No.: US 11,895,941 B2
(45) Date of Patent: Feb. 13, 2024

(54) TILLAGE SYSTEM WITH VARIABLE FERTILIZER APPLICATION

(71) Applicant: CNH Industrial America LLC, New Holland, PA (US)

(72) Inventor: Brian Falasz, Bloomington, IL (US)

(73) Assignee: CNH Industrial America LLC, New Holland, PA (US)

( * ) Notice: Subject to any disclaimer, the term of this patent is extended or adjusted under 35 U.S.C. 154(b) by 629 days.

(21) Appl. No.: 16/578,846

(22) Filed: Sep. 23, 2019

(65) Prior Publication Data

US 2021/0084810 A1    Mar. 25, 2021

(51) Int. Cl.
| | |
|---|---|
| A01C 21/00 | (2006.01) |
| A01C 7/20 | (2006.01) |
| A01C 23/00 | (2006.01) |
| A01B 49/06 | (2006.01) |
| A01B 79/02 | (2006.01) |

(52) U.S. Cl.
CPC ............ *A01C 21/007* (2013.01); *A01B 49/06* (2013.01); *A01B 79/02* (2013.01); *A01C 7/203* (2013.01); *A01C 23/007* (2013.01)

(58) Field of Classification Search
CPC ...... A01C 21/007; A01C 23/007; A01C 7/203
See application file for complete search history.

(56) References Cited

U.S. PATENT DOCUMENTS

| | | | |
|---|---|---|---|
| 4,637,547 A | 1/1987 | Hiniker et al. | |
| 4,738,377 A | 4/1988 | DeMoss, Jr. | |
| 5,050,771 A | 9/1991 | Hanson et al. | |
| 5,220,876 A | 6/1993 | Monson et al. | |

(Continued)

FOREIGN PATENT DOCUMENTS

| | | |
|---|---|---|
| CN | 1326442 | 2/2006 |
| DE | 112014000919 | 4/2017 |
| RU | 2321201 | 11/2007 |

OTHER PUBLICATIONS

Schumann, "Precise Placement and Variable Rate Fertilizer Application Technologies for Horticultural Crops", Hort Technology, Feb. 2010, 7 pgs.

(Continued)

*Primary Examiner* — Alicia Torres
(74) *Attorney, Agent, or Firm* — Rebecca L. Henkel; Rickard K. DeMille

(57) ABSTRACT

An agricultural implement including a frame, a plurality of ground engaging tools connected to the frame, a fertilizer device configured for applying at least one liquid fertilizer and including a plurality of fluid lines and a plurality of fertilizer applicator assemblies fluidly connected to the plurality of fluid lines. Each fertilizer applicator assembly includes an applicator connected to the frame and a valve fluidly connected to the applicator. The valve is configured for varying a rate of the at least one liquid fertilizer through the applicator. The agricultural implement also includes an electronic control unit operably connected to the valves of the plurality of fertilizer applicator assemblies and configured for automatically adjusting the valve of at least one fertilizer applicator assembly of the plurality of fertilizer applicator assemblies to vary the rate of the at least one liquid fertilizer, dependent upon a fertilizer requirement characteristic.

20 Claims, 3 Drawing Sheets

(56) References Cited

U.S. PATENT DOCUMENTS

| | | | |
|---|---|---|---|
| 5,478,013 | A | 12/1995 | Ballu |
| 5,870,686 | A | 2/1999 | Monson |
| 5,956,255 | A | 9/1999 | Flamme |
| 5,878,371 | A | 11/1999 | Hale et al. |
| 5,978,723 | A | 11/1999 | Hale et al. |
| 6,070,539 | A | 6/2000 | Flamme et al. |
| 6,178,900 | B1 | 1/2001 | Dietrich, Sr. |
| 6,269,757 | B1 | 8/2001 | Kiest |
| 6,748,884 | B1 | 6/2004 | Bettin et al. |
| 6,889,620 | B2 | 5/2005 | Fraisse et al. |
| 8,412,419 | B1 | 4/2013 | Seamon et al. |
| 8,558,157 | B2 | 10/2013 | Holland |
| 8,573,319 | B1 | 11/2013 | Casper et al. |
| 8,827,001 | B2 | 9/2014 | Wendte et al. |
| 8,857,530 | B2 | 10/2014 | Henry |
| 8,868,300 | B2 | 10/2014 | Kocer et al. |
| 9,241,439 | B2 | 1/2016 | Zunhammer |
| 9,282,688 | B2 | 3/2016 | Casper et al. |
| 10,188,027 | B2 | 1/2019 | Hahn et al. |
| 2003/0101918 | A1* | 6/2003 | Aspelin ............ A01C 21/007 111/100 |
| 2004/0149187 | A1 | 8/2004 | Buchholtz |
| 2011/0054743 | A1 | 3/2011 | Kocer et al. |
| 2013/0180742 | A1 | 7/2013 | Wendte et al. |
| 2014/0002489 | A1 | 1/2014 | Sauder et al. |
| 2014/0236431 | A1* | 8/2014 | Hendrickson ...... A01B 69/007 701/50 |
| 2015/0189829 | A1 | 7/2015 | Blunier et al. |
| 2016/0377520 | A1 | 12/2016 | Balvanz et al. |
| 2017/0055432 | A1 | 3/2017 | Graham et al. |
| 2017/0055433 | A1 | 3/2017 | Jamison |
| 2017/0188507 | A1 | 7/2017 | Zielke |
| 2018/0125000 | A1 | 5/2018 | Levy et al. |
| 2018/0128933 | A1 | 5/2018 | Koch et al. |
| 2018/0160613 | A1 | 6/2018 | Kovach et al. |
| 2018/0184576 | A1 | 7/2018 | Sauder et al. |
| 2018/0257657 | A1* | 9/2018 | Blank ................ B60W 10/20 |
| 2018/0263180 | A1 | 9/2018 | Schlipf et al. |
| 2019/0072937 | A1 | 3/2019 | Saito et al. |
| 2019/0232304 | A1* | 8/2019 | Grimm ............. B05B 12/006 |
| 2020/0146207 | A1 | 5/2020 | Long et al. |
| 2022/0192072 | A1* | 6/2022 | Achen ............... A01C 7/203 |

OTHER PUBLICATIONS

Fox, "Real-Time, Variable-Depth Tillage for Managing Soil Compaction in Cotton Production", Clemson University, May 2018, 67 pgs.

"Fertilizer Applicators, Applicators for Liquid, Anhydrous, Dry or Broadcast", Kongskilde Industries, Inc., Feb. 2010 20 pgs.

U.S. Appl. No. 16/542,163, Non-Final Office Action, dated Oct. 6, 2021, 84 pgs.

U.S. Appl. No. 16/542,163, Non-Final Office Action, dated Apr. 6, 2022, 29 pgs.

U.S. Appl. No. 16/542,163, Final Office Action, dated Sep. 19, 2022, 16 pgs.

U.S. Appl. No. 16/542,163, Non-Final Office Action, dated Feb. 2, 2023, 26 pgs.

U.S. Appl. No. 16/542,163, Final Office Action, dated May 16, 2023, 19 pgs.

U.S. Appl. No. 16/542,163, Advisory Action, dated Aug. 9, 2023, 3 pgs.

U.S. Appl. No. 16/542,163, Non-Final Office Action, dated Sep. 14, 2023, 51 pgs.

* cited by examiner

TILLAGE SYSTEM WITH VARIABLE FERTILIZER APPLICATION

BACKGROUND OF THE INVENTION

The present invention pertains to agricultural tillage implements and, more specifically, to a system for automatically adjusting the application of fertilizer.

Farmers utilize a wide variety of tillage systems to prepare soil for planting. For example, a strip tillage implement is capable of tilling soil in strips along the intended planting rows, moving residue to the areas in between rows, and preparing the seedbed of the strip in preparation for planting. As another example, a field cultivator is capable of simultaneously tilling soil and leveling the tilled soil in preparation for planting.

A tillage implement typically includes a frame that carries a number of cultivator shanks which can carry various tools for engaging the soil. The tools may include shovels, knives, points, sweeps, coulters, spikes, or plows. Each tool performs a function intended to ultimately convert compacted soil into a level seedbed with a consistent depth for providing desirable conditions for planting crops. A tillage implement may additionally include, or be connected with, other devices for inserting fertilizer following the passage of the cultivator shanks, closing the furrow created by the cultivator shanks, or breaking up the clods to create the uniform seedbed. For example, the tillage implement may be connected to an air cart which carries and injects fertilizer into the field.

The tillage implement may also include a control system which allows the operator to adjust or more operating parameters of the tillage implement. For example, if the operator wishes to lower the depth of the cultivator shanks, the operator must generally enter a command into the user interface of the control system, and the control system will accordingly adjust the actuator(s) to lower the cultivator shanks. Typically, the operator will set a desired command, such as a speed of the towing vehicle, a specific depth of the cultivator shanks, or the rate of fertilizer, and the control system will maintain the inputted command(s) throughout operation in the entire field. As can be appreciated, a field may not be uniform in soil composition; and thereby, the set and generalized operating parameters of the tillage implement may not provide the ideal operating parameter for certain portions of the field. Therefore, the control system of the tillage implement may lead to excess wear of the tillage implement, increased costs of working a field, and suboptimal planting conditions.

What is needed in the art is a cost-effective tillage system for automatically accommodating various field conditions.

SUMMARY OF THE INVENTION

In one exemplary embodiment formed in accordance with the present invention, there is provided an agricultural tillage system which generally includes an agricultural vehicle, a fertilizer device, an agricultural tillage implement, and an electronic control unit. The electronic control unit may automatically set and adjust the rate of liquid fertilizer by adjusting multiple valves in the fertilizer applicator assemblies of the fertilizer device, dependent upon an estimated or measured fertilizer requirement characteristic.

In another exemplary embodiment formed in accordance with the present invention, there is provided an agricultural implement that includes a frame, a plurality of ground engaging tools connected to the frame, a fertilizer device configured for applying at least one liquid fertilizer and including a plurality of fluid lines and a plurality of fertilizer applicator assemblies fluidly connected to the plurality of fluid lines. Each fertilizer applicator assembly includes an applicator connected to the frame and a valve fluidly connected to the applicator. The valve is configured for varying a rate of the at least one liquid fertilizer through the applicator. The agricultural implement also includes an electronic control unit operably connected to the valves of the plurality of fertilizer applicator assemblies and configured for automatically adjusting the valve of at least one fertilizer applicator assembly of the plurality of fertilizer applicator assemblies to vary the rate of the at least one liquid fertilizer, dependent upon a fertilizer requirement characteristic.

In yet another exemplary embodiment formed in accordance with the present invention, there is provided an agricultural tillage system that includes an agricultural vehicle, an agricultural implement towed by the agricultural vehicle and comprising a frame and a plurality of ground engaging tools connected to the frame, and a fertilizer device connected to the agricultural implement and configured for applying at least one liquid fertilizer. The fertilizer device includes a plurality of fluid lines and a plurality of fertilizer applicator assemblies fluidly connected to the plurality of fluid lines. Each fertilizer applicator assembly includes an applicator connected to the frame and a valve fluidly connected to the applicator. The valve is configured for varying a rate of the at least one liquid fertilizer through the applicator. The agricultural tillage system further includes an electronic control unit operably connected to the valves of the plurality of fertilizer applicator assemblies and configured for automatically adjusting the valve of at least one fertilizer applicator assembly of the plurality of fertilizer applicator assemblies to vary the rate of the at least one liquid fertilizer, dependent upon a fertilizer requirement characteristic.

In yet another exemplary embodiment formed in accordance with the present invention, there is provided a method for working a field. The method includes an initial step of providing an agricultural implement that includes an agricultural implement that includes a frame, a plurality of ground engaging tools connected to the frame, and a fertilizer device configured for applying at least one liquid fertilizer. The fertilizer device includes a plurality of fluid lines and a plurality of fertilizer applicator assemblies fluidly connected to the plurality of fluid lines. Each fertilizer applicator assembly includes an applicator connected to the frame and a valve fluidly connected to the applicator. The valve is configured for varying a rate of the at least one liquid fertilizer through the applicator. The agricultural implement includes an electronic control unit operably connected to the valves of the plurality of fertilizer applicator assemblies. The method includes the further step of adjusting the valve of at least one fertilizer applicator assembly of the plurality of fertilizer applicator assemblies to vary the rate of the at least one liquid fertilizer, dependent upon a fertilizer requirement characteristic.

One possible advantage of the exemplary embodiment of the agricultural tillage system is that the rate and/or type of the liquid fertilizer being applied may be automatically adjusted depending upon the soil nutrient level at a given location in the field.

Another possible advantage of the exemplary embodiment of the agricultural tillage system is that the overall cost of working a field may be reduced as the electronic control unit helps to optimize the amount of fertilizer being applied to the field.

BRIEF DESCRIPTION OF THE DRAWINGS

For the purpose of illustration, there are shown in the drawings certain embodiments of the present invention. It should be understood, however, that the invention is not limited to the precise arrangements, dimensions, and instruments shown. Like numerals indicate like elements throughout the drawings. In the drawings.

DETAILED DESCRIPTION OF THE INVENTION

The terms "forward", "rearward", "left" and "right", when used in connection with the agricultural vehicle and/or components thereof are usually determined with reference to the direction of forward operative travel of the vehicle, but they should not be construed as limiting. The terms "longitudinal" and "transverse" are determined with reference to the fore-and-aft direction of the agricultural vehicle and are equally not to be construed as limiting. The term "compaction layer" generally refers to a compressed layer of soil, beneath the soil surface, which may be less porous or impermeable. As used herein the term "compaction layer characteristic" may refer to the precise or estimated location of the compaction layer, such as the depth of the top of the compaction layer. The term compaction layer characteristic may also refer to any other feature or composition of the compaction layer. Also, as used herein, the term "fertilizer requirement characteristic" may refer a requirement to maintain, increase, or decrease the amount of fertilizer and/or change fertilizers based upon the precise or estimated nutrient level of the soil, the soil composition, and/or any other feature of the soil.

Figure 1:
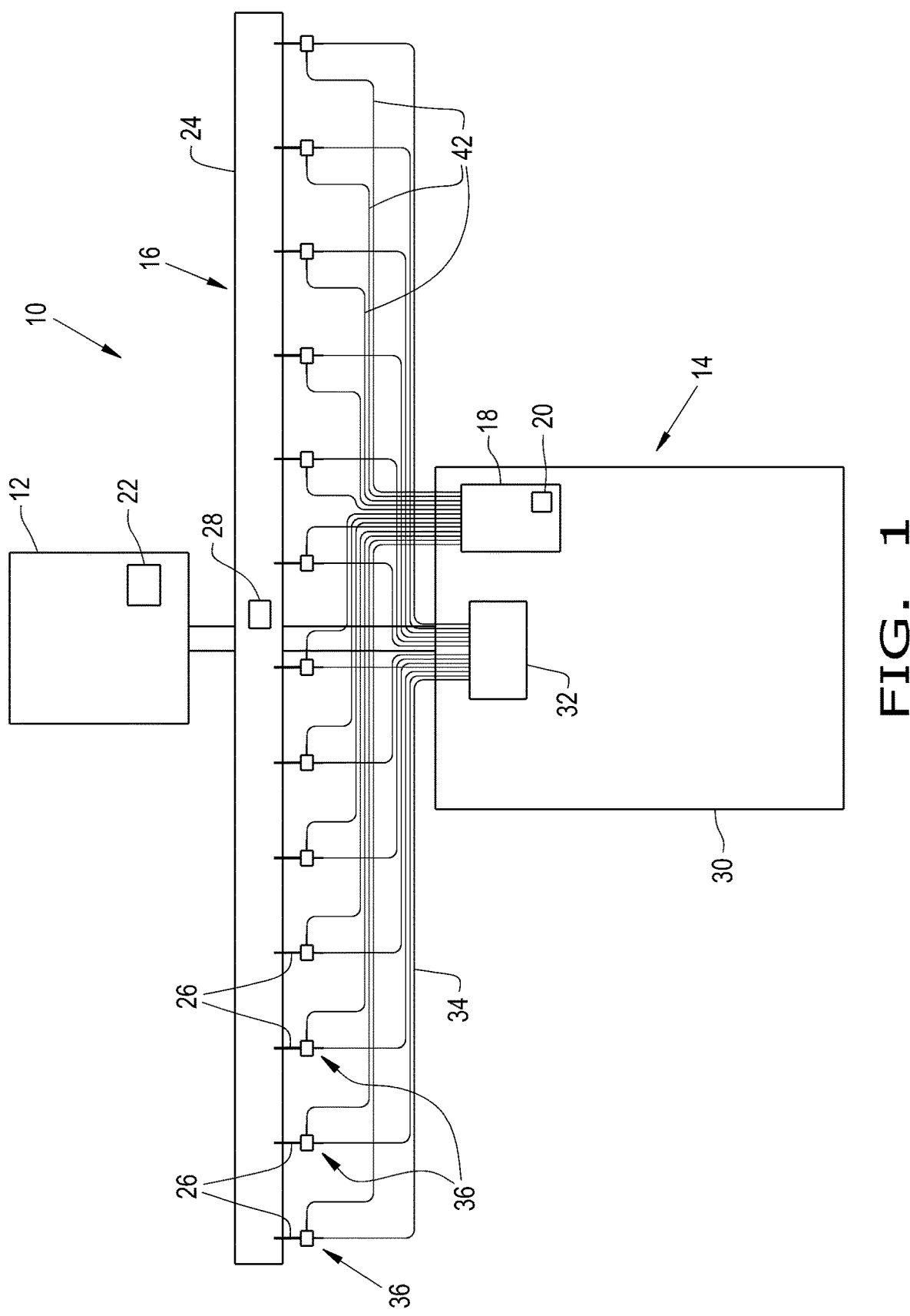
FIG. 1 illustrates a block diagram of an agricultural tillage system including an agricultural vehicle, an agricultural implement, and a fertilizer device, in accordance with an exemplary embodiment of the present invention.
Figure 2:
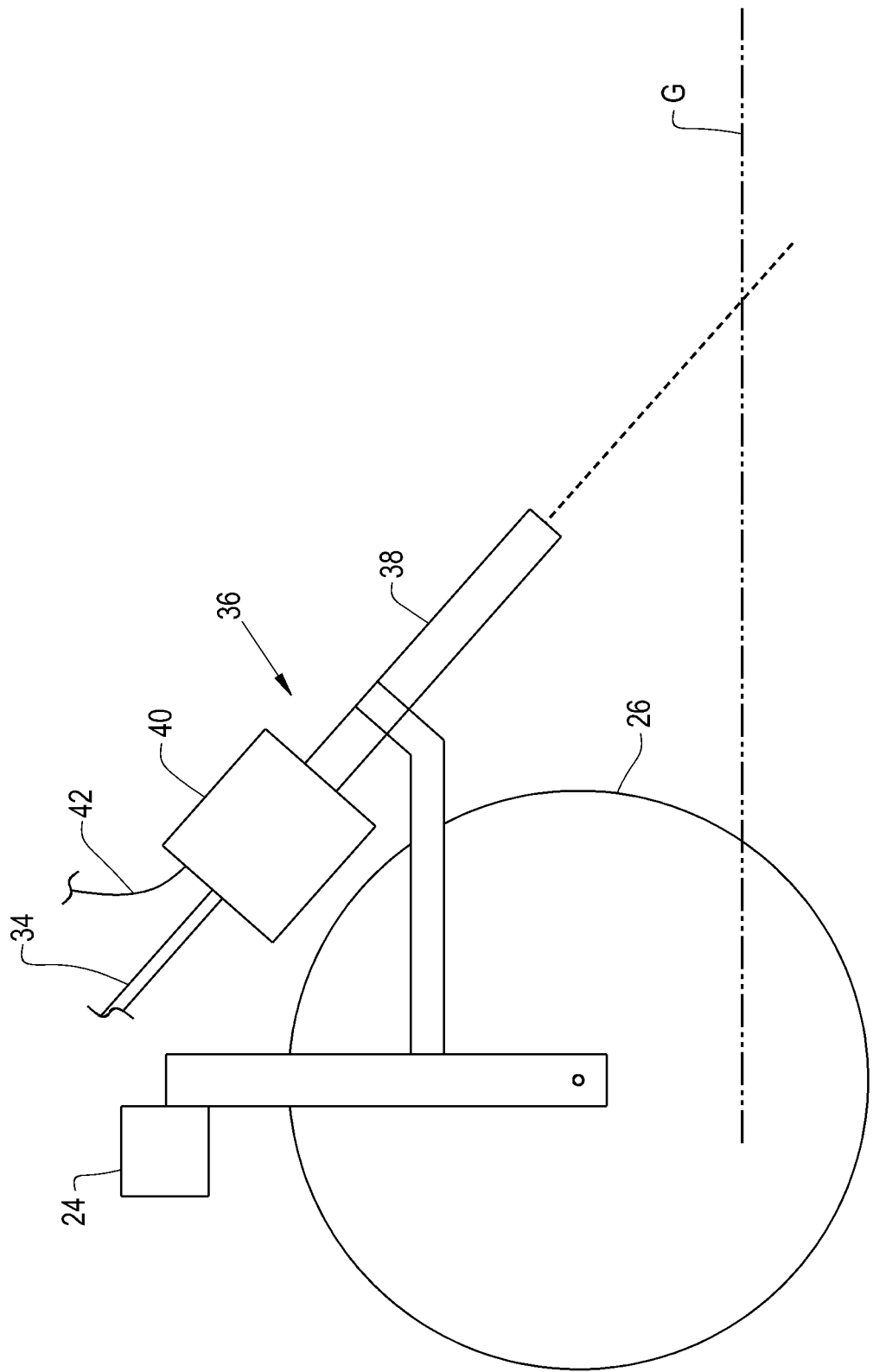
FIG. 2 illustrates a fertilizer applicator assembly of the fertilizer device and a ground engaging tool of the agricultural implement of FIG. 1.

Referring now to the drawings, and more particularly to FIGS. 1-2, there is shown an agricultural tillage system 10 for working a field. The agricultural tillage system 10 generally includes an agricultural vehicle 12 which tows a fertilizer device 14 and an agricultural implement 16. The agricultural tillage system 10 may also include an electronic control unit (ECU) 18, with a memory 20 for storing soil characteristics, and one or more global positioning system (GPS) location sensors 22 for sensing real-time location data. The ECU 18 may be configured for automatically adjusting the depth of the agricultural implement 16, the rate of the fertilizer, the type of fertilizer, and/or any other desired parameter depending upon a compaction layer characteristic and/or a fertilizer requirement characteristic.

The compaction layer and fertilizer requirement characteristics may be determined from real-time sensor readings and/or estimated from previously measured field data. For instance, the depth of the agricultural implement 16 and the rate of fertilizer may be automatically controlled responsive to various compaction layer depths and soil nutrient levels determined by overlays from a GPS location, yield maps, field agronomy, and/or real-time sensor readings.

The agricultural vehicle 12 may generally include a chassis, a prime mover, wheels and/or tracks, a cab for housing the operator, a hitch, and an ISOBUS connection for coupling with the agricultural implement 16 and/or fertilizer device 14. The agricultural vehicle 12 may be in the form of any desired agricultural vehicle, such as a tractor.

The agricultural implement 16 may generally include a frame 24, wheels, multiple ground engaging tools 26 connected to the frame 24, and at least actuator 28 directly or indirectly connected to the frame 24. It should be appreciated that the agricultural implement 16 may also incorporate the fertilizer device 14 and/or portions thereof. The agricultural implement 16 may be in the form of any desired implement, such as a fertilizer applicator implement, field cultivator, or sweep. For example, the agricultural implement 16 may be in the form of a Nutri-Placer 2800, manufactured by Case IH, Inc.

The multiple ground engaging tools 26 may include primary and/or secondary ground engaging tools for engaging the ground G (FIG. 2). For instance, the ground engaging tools 26 may be in the form of openers, coulters, and/or rollers. As shown, the ground engaging tools 26 are in the form of coulters 26. Additionally, the ground engaging tools 26 may also include ground engaging tools, such as leveling blades and/or rolling, i.e., crumbler, basket assemblies for finishing the soil.

The at least one actuator 28 may be connected to the frame 24. For example, the agricultural implement 16 may include multiple actuators connected in between the frame 24 and the wheels of the agricultural implement 16 for raising or lowering the depth of the ground engaging tools 26. Additionally or alternatively, the agricultural implement 16 may include an actuator 28 connected in between one or more sections of the frame 24. Each actuator 28 may be in the form of any desired actuator, such as a hydraulic cylinder.

The fertilizer device 14 may be a separate unit or integrated with the agricultural implement 16. The fertilizer device 14 generally includes at least one storage tank 30, a central control valve (not shown), a main rate controller 32, multiple fluid lines 34, and multiple fertilizer applicator assemblies 36. It should be appreciated that the fertilizer device 14 may be a separate unit, connectable to the agricultural implement 16 or agricultural vehicle 12, or be incorporated as part of the agricultural implement 16. As shown, the fertilizer device 14 is integrated into the frame 24 of the agricultural implement 16. Alternatively, the fertilizer device 14 may be in the form of an air cart 14, which is connected in between the agricultural vehicle 12 and the agricultural implement 16. The fertilizer device 14 may be in the form of any desired fertilizer device.

Each storage tank 30 may store a liquid fertilizer. However, it is conceivable that each storage tank could store a dry, granular fertilizer. If there are two storage tanks, the same fertilizer may be stored in each tank or a unique fertilizer may be stored in each respective storage tank (not shown). For instance, the ECU 18 may automatically switch between the two different fertilizers in the tanks as desired.

The fluid lines 34 may be in the form of hoses 34 which extend from the tank 30 to the fertilizer applicator assemblies 36. The fluid lines 34 may comprise any desired material, such as rubber. The main rate controller 32 may be fluidly connected in between the tank 30 and the fertilizer applicator assemblies 36.

The main rate controller 32 may be in the form of one or more ground-driven piston pumps, hydraulic or electric pumps, and/or adjustable valves. As shown, the main rate controller 32 is in the form of a hydraulic centrifugal pump 32 for transporting the liquid fertilizer from the tank 30 to the fertilizer applicator assemblies 36.

The fertilizer applicator assemblies 36 are connected to and carried by the agricultural implement 16 (FIG. 2). Each fertilizer applicator assembly 36 includes an applicator 38 connected to the frame 24 and an adjustable valve 40 fluidly connected to the applicator 38. The applicators 38 may be in the form of hose outlets, for example drip nozzles, spray nozzles, high-pressure injectors, "liquid knives", i.e., a hose outlet with adjacent knife blades for directing the fluid stream, and/or any other desired outlet for allowing liquid fertilizer to pass therethrough. The valves 40 are fluidly coupled to the applicators 38 and operably coupled to the ECU 18 by a wired or wireless connection. Each valve 40 varies the rate of the liquid fertilizer through the applicator 38. The valves 40 may be in the form of electric valves, e.g. solenoid valves, pneumatic valves, and/or hydraulic valves. For example, as illustrated in the present exemplary embodiment, the valves 40 are solenoid valves 40 which are each connected to the ECU 18 via a respective wire 42.

The ECU 18 may be operably connected to and/or incorporated within the agricultural vehicle 12, the fertilizer device 14, and/or the agricultural implement 16. The ECU 18 may be operably connected to the main rate controller 32, the valves 40, and the at least one actuator 28. The ECU 18 may include the memory 20, or any other desired tangible computer readable medium, such as a separate remote storage server that is accessible by the ECU 18, for storing data, software code, or instructions. For instance, the memory 20 may store a yield map, which provides crop yield by geographic position, reported form the combine yield data of the previously harvested crop. The memory 20 may store field agronomy data from one or more soil sample measurements, such as prior in-field measurements of the compaction layer, the soil nutrient level, moisture level, remaining residue, and/or any other desired soil parameter. The ECU 18 may compute, e.g. estimate or retrieve from the memory 20, one or more compaction layer characteristics and/or fertilizer requirement characteristics based from the previously measured compaction layer and soil nutrient measurements and/or the real-time sensor readings from the GPS sensor 22 of the agricultural vehicle 12, a compaction layer sensor, and yield map data. Thus, the ECU 18 may compute the compaction layer characteristic from GPS location data, yield map data, measured compaction layer data, and/or estimated compaction layer data, as well as the fertilizer requirement characteristic from GPS location data, yield map data, estimated fertilizer data from yield map data, and/or estimated fertilizer data extrapolated from previous in-field soil measurements. Furthermore, the ECU 18 raises or lowers the depth of the agricultural implement 16, increases or decreases the rate of fertilizer via the valves 40, and/or changes the fertilizer being applied in response to the compaction layer and/or fertilizer requirement characteristics. The ECU 18 may be in the form of any desired ECU or controller. The ECU 18 may be incorporated into the existing software and/or hardware of the agricultural vehicle 12, the fertilizer device 14, and/or the agricultural implement 16. For example, the ECU 18 may be incorporated into the soil command system of the agricultural vehicle 12 and/or implement 16. However, the ECU 18 may be a separate rate controller which interfaces with the existing soil command system of the agricultural vehicle 12 and/or implement 16.

The GPS sensor 22 may be operably connected to the ECU 18 and configured for providing a position signal indicative of the position of the agricultural implement 16. The GPS sensor 22 may be mounted onto the agricultural vehicle 12 and/or the agricultural implement 16. The GPS sensor 22 may be in the form of any desired position sensor. It should be appreciated that the agricultural implement 16 may also include other types of sensors, such as a compaction layer sensor, e.g. a ground penetrating radar sensor, for measuring and communicating measured compaction layer data to the ECU 18.

Figure 3:
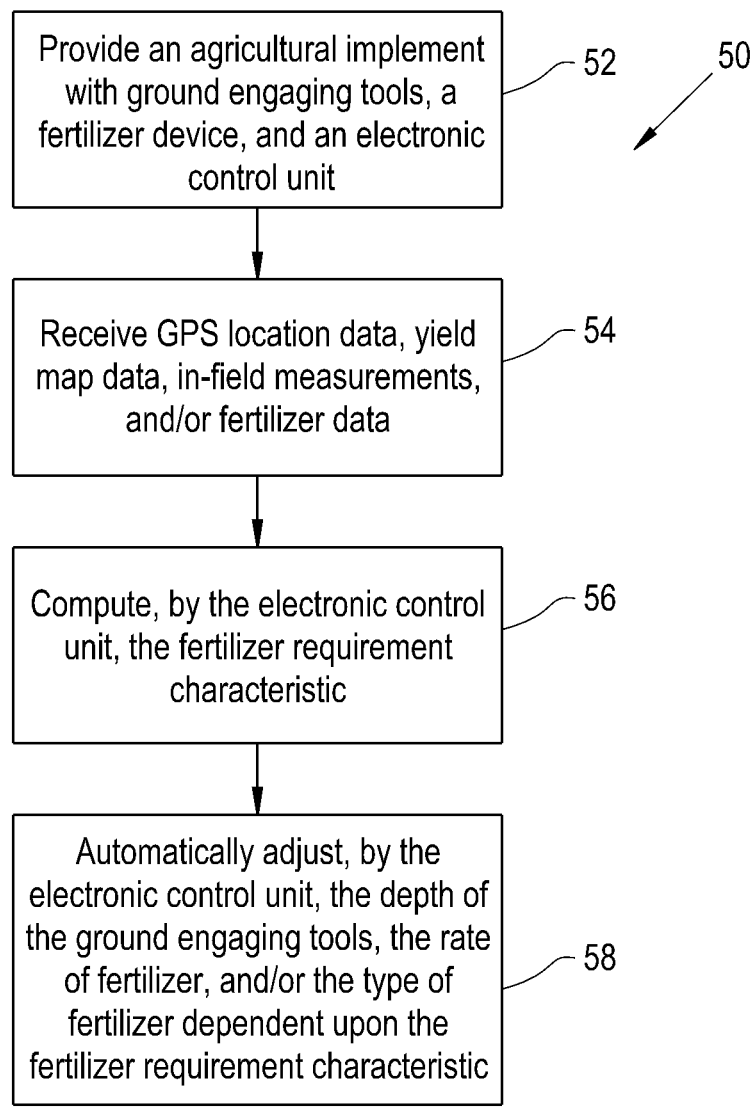
FIG. 3 illustrates a flow diagram of a method for working a field, in accordance with an exemplary embodiment of the present invention.

Referring now to FIG. 3, there is shown a flow diagram of a method 50 for working a field. The method 50 may include an initial step of providing an agricultural tillage system 10 which generally includes an agricultural vehicle 12, a fertilizer device 14, an agricultural implement 16, and an ECU 18, as discussed above (at block 52). Next, the ECU 18 may receive real-time data and/or stored data from the memory 20 (at block 54). For example, the ECU 18 may receive GPS location data from the GPS sensor 22, yield map data, in-field measurements, estimated and/or measured compaction layer data, and/or estimated and/or measured fertilizer data. The ECU 18 may then compute the fertilizer requirement characteristic at a given location, which is known by way of the GPS sensor 22, from the received real-time and/or stored data (at block 56). For example, the ECU 18 may compute the fertilizer requirement by estimating the soil nutrient level from crop yield from the crop yield map and/or by extrapolating, across the entire field, one or more measured soil nutrient levels at one or more locations in the field, having known crop yields. Additionally, the ECU 18 may compute a compaction layer characteristic. Then, the ECU 18 may automatically adjust the depth of the plurality of ground engaging tools, the rate of the fertilizer via adjusting the valves 40, and/or the type of fertilizer dependent upon the fertilizer requirement characteristic (at block 58). The ECU 18 may also make various adjustments dependent upon the compaction layer characteristic. Initially, the ECU 18 may set an initial or starting depth of the ground engaging tools 26 and an initial rate of fertilizer, and then the ECU 18 may automatically raise or lower the ground engaging tools 26 and/or increase or decrease the rate of fertilizer by further opening or closing the valves 40. For example, in lower yielding areas, the ECU 18 may automatically lower the depth of the ground engaging tools 26, upon estimating or sensing if the compaction layer is deeper, and apply a greater amount of fertilizer, upon estimating a low nutrient level at a given location in the field. Additionally, for example, the ECU 18 may automatically switch between one fertilizer to another differing fertilizer, dependent upon the fertilizer requirement characteristic.

It is to be understood that the steps of the method 50 are performed by the controller 18 upon loading and executing software code or instructions which are tangibly stored on a tangible computer readable medium 20, such as on a magnetic medium, e.g., a computer hard drive, an optical medium, e.g., an optical disc, solid-state memory, e.g., flash memory, or other storage media known in the art. Thus, any of the functionality performed by the controller 18 described herein, such as the method 50, is implemented in software code or instructions which are tangibly stored on the tangible computer readable medium 20. The controller 18 loads the software code or instructions via a direct interface with the computer readable medium or via a wired and/or wireless network. Upon loading and executing such software code or instructions by the controller 18, the controller 18 may perform any of the functionality of the controller 18 described herein, including any steps of the method 50 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

In providing the compaction layer characteristic, the ECU 18 may perform any desired calculation and/or retrieve any desired data. For example, the depth of the compaction layer may be determined from global positioning system (GPS) location data, yield map data, measured compaction layer data, and/or estimated compaction layer data. The measured compaction layer characteristic may be determined from real-time compaction layer data, measured by one or more compaction layer sensors, and/or prior compaction layer data which was measured from previous in-field compaction layer measurements. The estimated compaction layer characteristic may be determined from extrapolating one or more prior in-field measurements at a given location and averaging the measured result across the entire field in correlation with location and yield map data. Compaction layer depth may be correlated to yield map data. For example, a correlation of whether in-field measurements show that a location with a high crop yield, which was indicated by yield map data, has a certain compaction layer depth and another location with a low crop yield has a differing compaction layer depth may exist. This correlation may be used to subsequently estimate the compaction layer depth in other locations in the field. Furthermore, in providing the fertilizer requirement characteristic, the ECU 18 may also perform any desired calculation and/or retrieve any desired data. For example, the fertilizer requirement characteristic, and the soil nutrient level therewith, may be determined from GPS location data from the GPS sensor 22, yield map data, estimated fertilizer data based on yield map data, in-field soil measurements, and/or estimated fertilizer data extrapolated from previous in-field soil measurements. The soil nutrient level may be correlated to the crop yield. For instance, a low yield area may correspond to a low soil nutrient area, which may require additional fertilizer, and a high yield area may correspond to a high soil nutrient area, which may require less fertilizer.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

The invention claimed is:

1. An agricultural implement, comprising:
    a frame;
    a plurality of ground engaging tools connected to the frame;
    a fertilizer device configured for applying at least one liquid fertilizer and comprising a plurality of fluid lines and a plurality of fertilizer applicator assemblies fluidly connected to the plurality of fluid lines, and each fertilizer applicator assembly comprising an applicator connected to the frame and a valve fluidly connected to the applicator, and the valve being configured for varying a rate of the at least one liquid fertilizer through the applicator; and
    an electronic control unit operably connected to the valves of the plurality of fertilizer applicator assemblies and configured for automatically adjusting the valve of at least one fertilizer applicator assembly of the plurality of fertilizer applicator assemblies to vary the rate of the at least one liquid fertilizer, dependent upon a fertilizer requirement characteristic, the electronic control unit being configured for adjusting a depth of the plurality of ground engaging tools dependent upon a compaction layer characteristic, wherein the electronic control unit is configured to determine the compaction layer characteristic based at least upon a crop yield map data and upon real-time compaction layer data determined by a compaction layer sensor.

2. The agricultural implement of claim 1, further comprising a global positioning system (GPS) sensor operably connected to the electronic control unit and configured for providing a position signal indicative of a position of the agricultural implement.

3. The agricultural implement of claim 2, wherein the fertilizer requirement characteristic is determined from the position signal of the GPS sensor, estimated fertilizer data based on yield map data, and estimated fertilizer data extrapolated from previous in-field soil measurements.

4. The agricultural implement of claim 1, wherein the fertilizer requirement characteristic is determined from at least one of estimated fertilizer data based on yield map data and estimated fertilizer data extrapolated from previous in-field soil measurements.

5. The agricultural implement of claim 1, wherein the electronic control unit comprises a memory which stores field agronomy data from at least one soil sample measurement.

6. The agricultural implement of claim 5, wherein the at least one soil sample measurement is at least one in-field measurement of a soil nutrient level.

7. The agricultural implement of claim 1, wherein the plurality of ground engaging tools comprises a plurality of coulters, and each fertilizer applicator is located behind a respective coulter.

8. The agricultural implement of claim 1, wherein the valve of each fertilizer applicator assembly is a solenoid valve.

9. An agricultural tillage system, comprising:
    an agricultural vehicle;
    an agricultural implement towed by the agricultural vehicle and comprising a frame and a plurality of ground engaging tools connected to the frame;
    a fertilizer device connected to the agricultural implement and configured for applying at least one liquid fertilizer, the fertilizer device comprising a plurality of fluid lines and a plurality of fertilizer applicator assemblies fluidly connected to the plurality of fluid lines, and each fertilizer applicator assembly comprising an applicator connected to the frame and a valve fluidly connected to the applicator, and the valve being configured for varying a rate of the at least one liquid fertilizer through the applicator; and an electronic control unit operably connected to the valves of the plurality of fertilizer applicator assemblies and configured for automatically adjusting the valve of at least one fertilizer applicator assembly of the plurality of fertilizer applicator assemblies to vary the rate of the at least one liquid fertilizer, dependent upon a fertilizer requirement characteristic, the electronic control unit being configured for adjusting a depth of the plurality of ground engaging tools dependent upon a compaction layer characteristic, wherein the electronic control unit is configured to determine the compaction layer characteristic based at least upon a crop yield map data and upon real-time compaction layer data determined by a compaction layer sensor.

10. The agricultural tillage system of claim 9, further comprising a global positioning system (GPS) sensor operably connected to the electronic control unit and configured for providing a position signal indicative of a position of the agricultural implement.

11. The agricultural tillage system of claim 10, wherein the fertilizer requirement characteristic is determined from the position signal of the GPS sensor, estimated fertilizer data based on yield map data, and estimated fertilizer data extrapolated from previous in-field soil measurements.

12. The agricultural tillage system of claim 9, wherein the fertilizer requirement characteristic is determined from at least one of estimated fertilizer data based on yield map data and estimated fertilizer data extrapolated from previous in-field soil measurements.

13. The agricultural tillage system of claim 9, wherein the electronic control unit comprises a memory which stores field agronomy data from at least one soil sample measurement.

14. The agricultural tillage system of claim 13, wherein the at least one soil sample measurement is at least one in-field measurement of a soil nutrient level.

15. The agricultural tillage system of claim 9, wherein the plurality of ground engaging tools comprises a plurality of coulters, and each fertilizer applicator is located behind a respective coulter.

16. The agricultural tillage system of claim 9, wherein the valve of each fertilizer applicator assembly is a solenoid valve.

17. A method for working a field, comprising:

providing an agricultural implement comprising a frame, a plurality of ground engaging tools connected to the frame, a fertilizer device configured for applying at least one liquid fertilizer and comprising a plurality of fluid lines and a plurality of fertilizer applicator assemblies fluidly connected to the plurality of fluid lines, and each fertilizer applicator assembly comprising an applicator connected to the frame and a valve fluidly connected to the applicator, and the valve being configured for varying a rate of the at least one liquid fertilizer through the applicator, and an electronic control unit operably connected to the valves of the plurality of fertilizer applicator assemblies; and adjusting the valve of at least one fertilizer applicator assembly of the plurality of fertilizer applicator assemblies to vary the rate of the at least one liquid fertilizer, dependent upon a fertilizer requirement characteristic; and adjusting, by the electronic control unit, a depth of the plurality of ground engaging tools dependent upon a compaction layer characteristic, wherein the electronic control unit is configured to determine the compaction layer characteristic based at least upon a crop yield map data and upon real-time compaction layer data determined by a compaction layer sensor.

18. The method of claim 17, further including a step of computing, by the electronic control unit, the fertilizer requirement characteristic from at least one of estimated fertilizer data based on yield map data and estimated fertilizer data extrapolated from previous in-field soil measurements.

19. The method of claim 17, wherein the agricultural implement further comprises a global positioning system (GPS) sensor operably connected to the electronic control unit, and the method further comprises a step of sensing, by the GPS sensor, a position signal indicative of a position of the agricultural implement.

20. The method of claim 19, wherein the fertilizer requirement characteristic is determined from the position signal of the GPS sensor, estimated fertilizer data based on yield map data, and estimated fertilizer data extrapolated from previous in-field soil measurements.

\* \* \* \* \*